United States Patent
Dannan

(10) Patent No.: US 10,005,108 B2
(45) Date of Patent: Jun. 26, 2018

(54) LENS CLEANING METHOD FOR A SURVEILLANCE CAMERA

(71) Applicant: Robert Bosch GmbH, Stuttgart (DE)

(72) Inventor: Benjamin Dannan, Marietta, PA (US)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 15/295,026

(22) Filed: Oct. 17, 2016

(65) Prior Publication Data

US 2018/0104721 A1 Apr. 19, 2018

(51) Int. Cl.
| | | |
|---|---|---|
| *B08B 7/04* | (2006.01) | |
| *B08B 1/00* | (2006.01) | |
| *G02B 27/00* | (2006.01) | |
| *H04N 7/18* | (2006.01) | |
| *B60S 1/08* | (2006.01) | |
| *B60R 1/12* | (2006.01) | |

(52) U.S. Cl.
CPC .......... *B08B 1/001* (2013.01); *G02B 27/0006* (2013.01); *B08B 1/006* (2013.01); *B60R 2001/1253* (2013.01); *B60S 1/0848* (2013.01); *H04N 7/183* (2013.01)

(58) Field of Classification Search
CPC ......... B08B 1/00; B08B 1/006; B60S 1/0848; B60R 2001/1253; G02B 27/0006; H04N 7/183
See application file for complete search history.

(56) References Cited

U.S. PATENT DOCUMENTS

| | | | | |
|---|---|---|---|---|
| 4,703,237 A | * | 10/1987 | Hochstein | ............. B60S 1/0818 15/DIG. 15 |
| 6,020,704 A | | 2/2000 | Buschur | |
| 6,094,981 A | | 8/2000 | Hochstein | |

(Continued)

FOREIGN PATENT DOCUMENTS

| | | |
|---|---|---|
| EP | 0753438 A1 | 1/1997 |
| EP | 1669779 A1 | 6/2006 |

(Continued)

OTHER PUBLICATIONS

Search Report from the United Kingdom Intellectual Property Office for Application No. GB1716958.2 dated Feb. 21, 2018 (5 pages).

(Continued)

*Primary Examiner* — Sharidan Carrillo
(74) *Attorney, Agent, or Firm* — Michael Best & Friedrich LLP

(57) ABSTRACT

A cleaning method for a surveillance camera uses a capacitive sensor to determine whether rain, ice, dirt, debris or other foreign objects are present on the camera lens substrate. A determination is made whether the sensed capacitance is greater than a first threshold indicative of the presence of a foreign object on the lens. If a foreign object is indicated, the lens is sprayed with a sprayer and then a wiper is activated. If a foreign object is not indicated, a determination is made whether ice is present by comparing the sensed capacitance to a second threshold that is less than the first threshold. If ice is present, wiper and lens defrosters are activated, and a wiper is then turned on. The cleaning method may include a temperature sensor and power management for the defrosters.

11 Claims, 21 Drawing Sheets

(56) References Cited

U.S. PATENT DOCUMENTS

| | | |
|---|---|---|
| 8,567,963 B1 | 10/2013 | Criscuolo et al. |
| 8,903,121 B2 | 12/2014 | Heenan et al. |
| 8,982,273 B2 | 3/2015 | Bingle et al. |
| 9,045,112 B2 | 6/2015 | Kracker et al. |
| 2006/0048572 A1 | 3/2006 | Isogai et al. |
| 2007/0084484 A1 | 4/2007 | Porter et al. |
| 2009/0085755 A1 | 4/2009 | Schafer et al. |
| 2011/0138567 A1* | 6/2011 | Pearson ............... B60S 1/0825 15/250.12 |
| 2014/0043478 A1 | 2/2014 | Burton |

FOREIGN PATENT DOCUMENTS

| | | |
|---|---|---|
| EP | 2988122 A1 | 2/2016 |
| JP | 2009267531 A | 11/2009 |
| NL | 2011845 C | 6/2015 |
| WO | 2007081470 A1 | 7/2007 |
| WO | 2007093822 A1 | 8/2007 |

OTHER PUBLICATIONS

Search Report from the United Kingdom Intellectual Property Office for Application No. GB1717017.6 dated Apr. 17, 2018 (6 pages).

\* cited by examiner

US 10,005,108 B2

LENS CLEANING METHOD FOR A SURVEILLANCE CAMERA

FIELD

Embodiments of the invention relate to systems for cleaning the lens for a surveillance camera.

BACKGROUND

Surveillance cameras are ubiquitous in many places throughout the world. Many surveillance cameras are located outdoors, and are subject to environmental elements such as rain, ice, snow, dirt and debris. It is important to keep the lenses clear for surveillance cameras so that the images they display or record are readily viewable.

SUMMARY

In some embodiments, the invention provides a method for cleaning a lens of a surveillance camera, including sensing a sensed capacitance of a camera substrate using a capacitance sensor. The sensed capacitance is converted to a digital capacitance value using a capacitive to digital converter. A first device is activated, using a controller, when the digital capacitance value exceeds a first threshold that is greater than a second threshold. A second device is activated when the digital capacitance value is less than the first threshold and greater than the second threshold. In some embodiments, a device is activated when the digital capacitance values is less than the second threshold but exceeds a third threshold. In some embodiments, a device is activated when the digital capacitance value is less than the third threshold but exceeds a fourth threshold.

In some embodiments, the invention provides a method for cleaning a surveillance camera lens including a feedback loop performed after a lens cleaning operation has occurred according to the first embodiment discussed above. Then, a second sensed capacitance is sensed with the capacitance sensor. The second sensed capacitance is converted to a second digital capacitance value. The first device is activated when the second digital capacitance value exceeds the first threshold, and a second device is activated when the second digital capacitance value is less than the first threshold and greater than the second threshold. In some embodiments, a device is activated when the digital capacitance values is less than the second threshold but exceeds a third threshold. In some embodiments, a device is activated when the digital capacitance value is less than the third threshold but exceeds a fourth threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more electronic processors, one or more memory modules including non-transitory computer-readable medium, one or more input/output interfaces, and various connections (e.g., a system bus) connecting the components.

Figure 1:
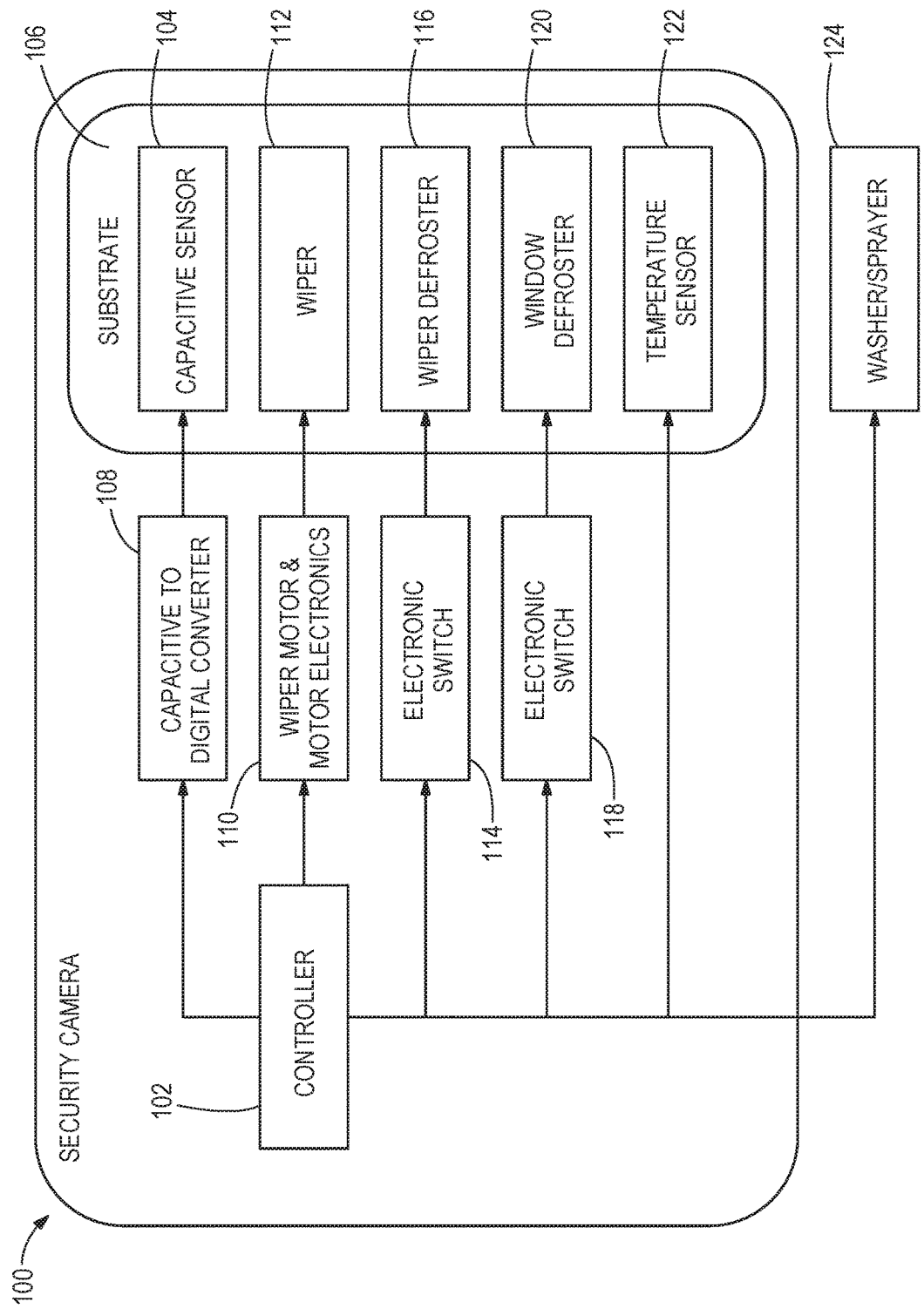
FIG. 1 is a block diagram depicting a completely closed loop surveillance camera control system.

FIG. 1 is a block diagram depicting a surveillance camera control system that may be used with the invention. FIG. 1 depicts a completely closed loop feedback control system that includes a temperature sensor for sensing the temperature of the camera lens or substrate. In other embodiments described herein, partially closed loop system (see FIGS. 5 and 6) omit the temperature sensor.

In FIG. 1, control system 100 includes a controller 102. A capacitance sensor 104 disposed on a camera lens or substrate 106 provides a sensed capacitance to a capacitive to digital converter 108 which provides a digital capacitance value to controller 102. Depending upon the magnitude of the digital capacitance value (derived from the difference between the empirical or sensed digital capacitance value and a baseline capacitance for a clean substrate 106), the controller may send a control signal to wiper motor and motor electronics 110 to turn on wiper 112 to clean the substrate 106. Alternatively, if the magnitude of the digital capacitance value indicates that moisture present on substrate 106 is ice or snow or in response to the temperature sensed by temperature sensor 122, controller 102 sends a control signal to an electronic switch 114 to activate a wiper defroster 116 instead of turning on wiper 112. At the same time, controller 102 sends a control signal to an electronic switch 118 to activate a window defroster 120. If debris, dirt or another foreign object is detected on substrate 106 based upon the sensed digital capacitance value, controller may activate a washer/sprayer 124.

The embodiments of the invention use the sensed capacitance of substrate 106 to make a determination as to which type of substance is present on substrate 106. The capacitance is determined by the equation Capacitance=(permittivity)(area of capacitor)/(distance between capacitor plates)    (Eq 1)

Permittivity is dependent upon the nature of the material or substance. In general and for a finite, similar volume of the substance, the permittivities of selected substances which are present on a glass substrate of known surface area are mathematically related as follows:

water>mud paste>ice>dry soil>oil    (Eq 2)

As a result, the sensed capacitance of substrate 106 may be used to determine the nature of the substance on the substrate 106 and to take an appropriate action.

Figure 2:
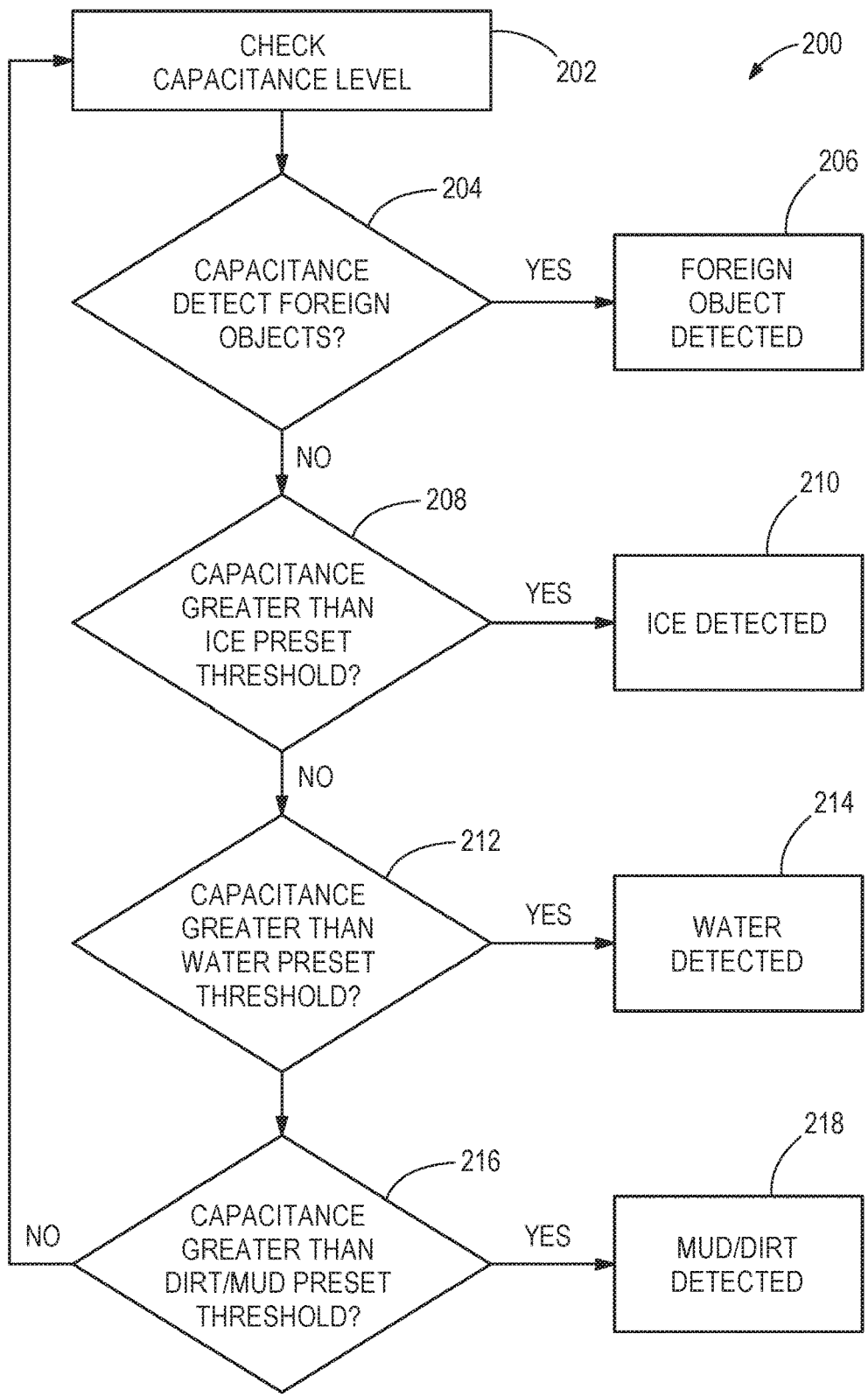
FIG. 2 is a flow diagram of a partial closed loop surveillance camera control system according to an embodiment of the invention.

FIG. 2 is an overall system flow diagram for a camera lens cleaning method 200 according to an embodiment of the invention. In FIG. 2, the method initially senses the capacitance of the glass substrate 106 at block 202. A determination is made at block 204 whether the digital capacitance value is greater than a threshold indicating that a foreign object is present on the substrate 106. As used herein, the term "threshold" refers to a difference between a baseline capacitance for a clean substrate 106 and the empirical or sensed capacitance value. If the answer at block 204 is Yes, the program branches to block 206 to clean the lens or substrate 106. If the answer at block 204 is No, a determination is made at block 208 whether the digital capacitance value is greater than a threshold indicative of frozen moisture. If the answer at block 208 is Yes, the program branches to block 210 so that the protocol for dealing with ice is used. If the answer at block 208 is No, a determination is made at block 212 whether the digital capacitance value is greater than another threshold that is indicative of liquid moisture or rain. If the answer at block 210 is Yes, the program proceeds to block 214 so that the protocol for dealing with water is used. If the answer at block 212 is No, a determination is made at block 216 whether the digital capacitance value is greater than a threshold indicative of the presence of dirt or mud on the camera lens. If the answer at block 216 is Yes, the program branches to block 218 so that the protocol for dealing with dirt or mud is used.

Figure 3:
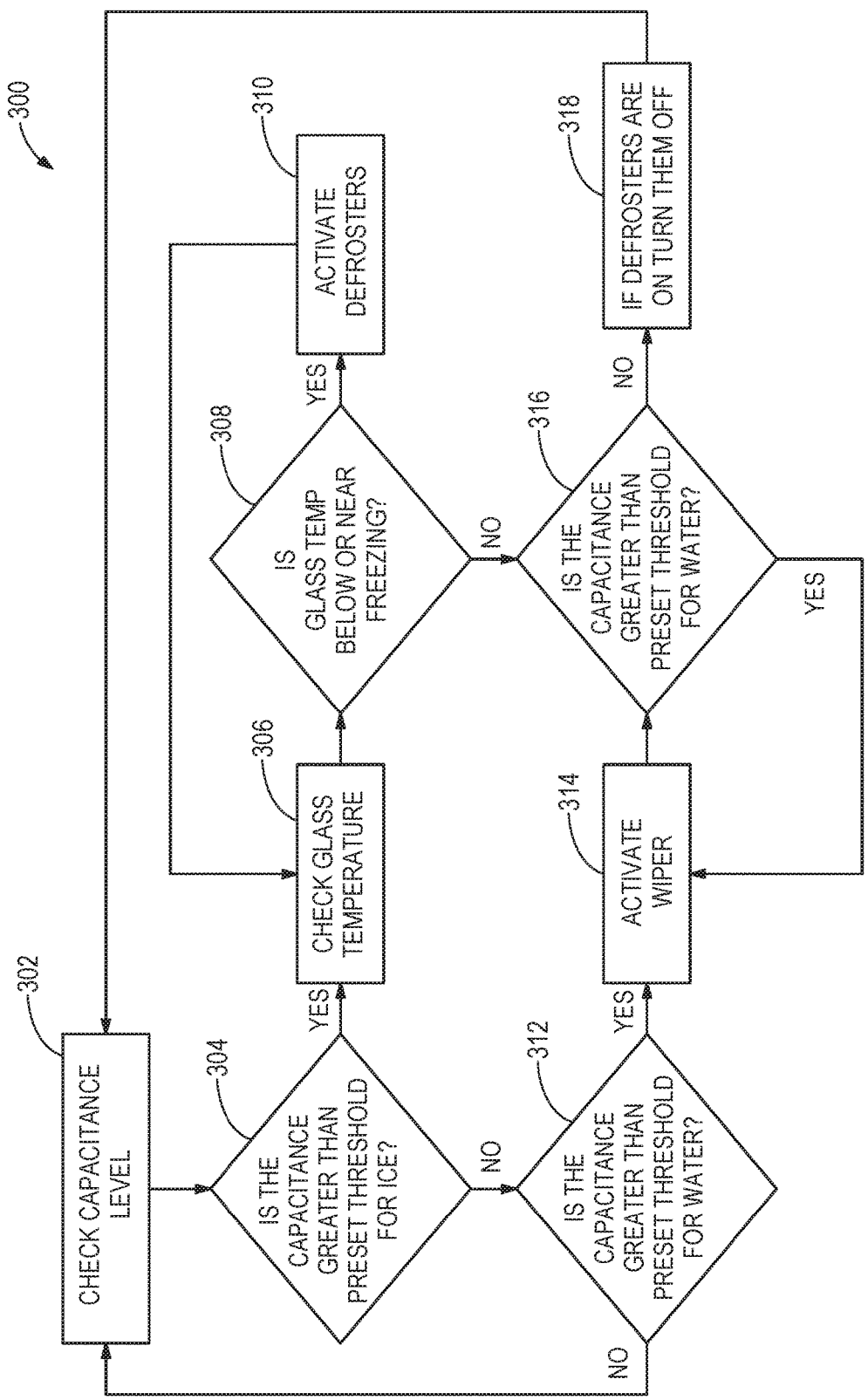
FIG. 3 is a flow diagram of a completely closed loop control system that detects moisture or other liquid according to one embodiment of the invention.

FIG. 3 is a flow diagram of a completely closed loop feedback method that detects moisture. In FIG. 3, method 300 begins at block 302 by sensing the capacitance of the camera substrate 106. A determination is then made at block 304 whether the digital capacitance value is greater than a threshold indicative of frozen moisture or ice. If the answer at block 304 is Yes, the sensed temperature of the camera substrate 106 is sensed at block 306, and a determination is made at block 308 whether the substrate temperature is near or below freezing (32 degrees Fahrenheit or 0 degrees Centigrade). If the Answer at block 308 is Yes, then the wiper defroster 116 and the substrate defroster 120 (FIG. 1) are activated at block 310 instead of the wiper to protect the wiper from damage. The program then loops back to block 306 to again sense the temperature of substrate 106. If the answer at block 308 is No (the sensed temperature is above freezing), program control flow proceeds to block 316 discussed below.

Referring again to FIG. 3, if the determination at block 304 is No, then a determination is made at block 312 whether the digital capacitance value (which is less than the ice threshold via block 304) is greater than a threshold indicative of the presence of liquid moisture on substrate 106. If the Answer at block 312 is No, the program returns to block 302 to again check the capacitance of the camera substrate. If the determination at block 312 is Yes, the wiper 112 is activated at block 314, the substrate capacitance is sensed again, and a determination is made at block 316 whether the digital capacitance value corresponding to the sensed capacitance is greater than the threshold indicative of the presence of water. If the answer at block 316 is Yes, program control flow returns to block 314 so that the wipers remain activated. If the answer at block 316 is No, the wiper and window defrosters are turned Off if they had been On at block 318, and the program returns to block 302.

Figure 4A:
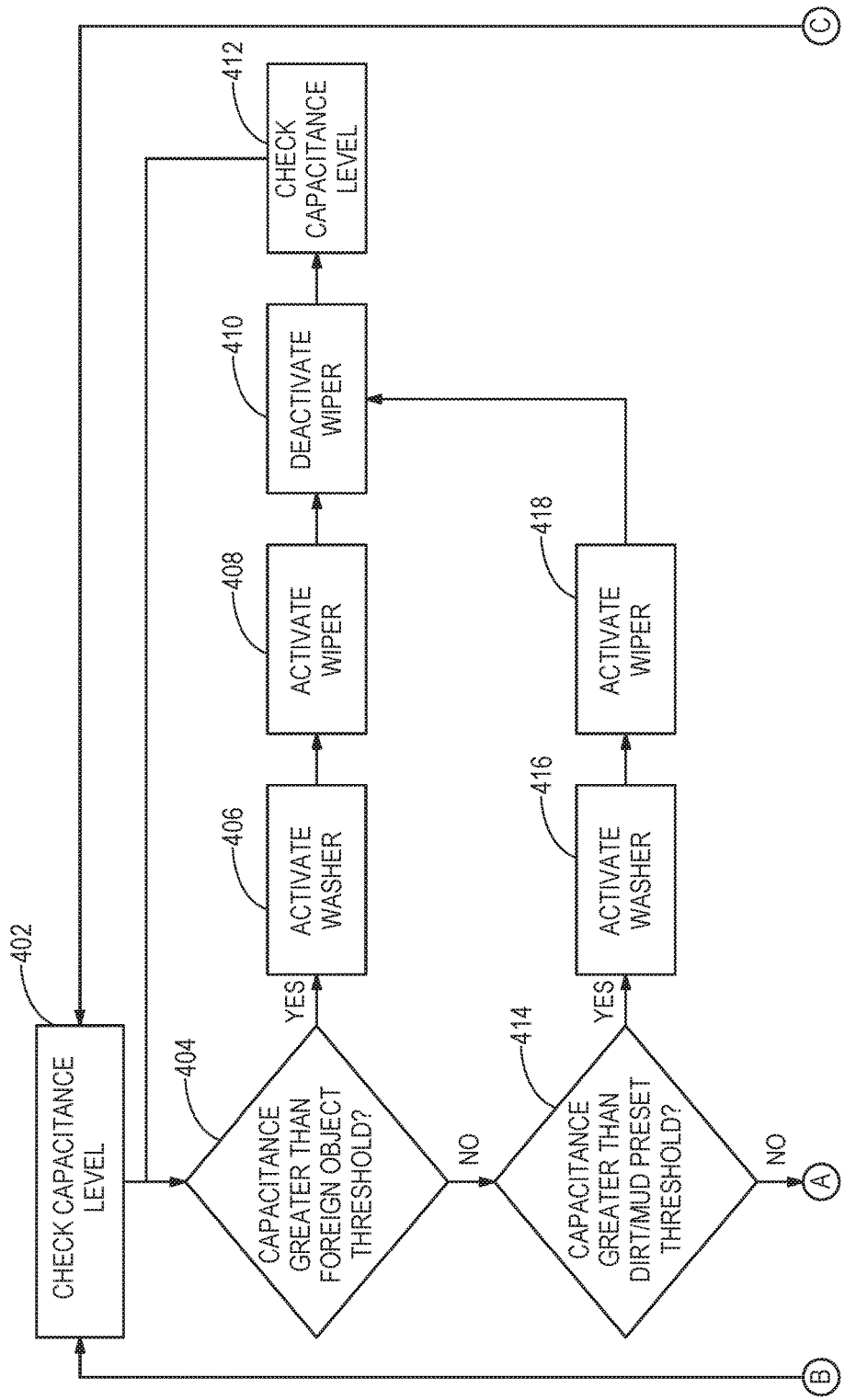
FIGS. 4A and 4B are flow diagrams of a completely closed loop control system according to another embodiment of the invention that detects moisture or another liquid, dirt and debris, and also includes power management for the lens defroster.
Figure 4B:
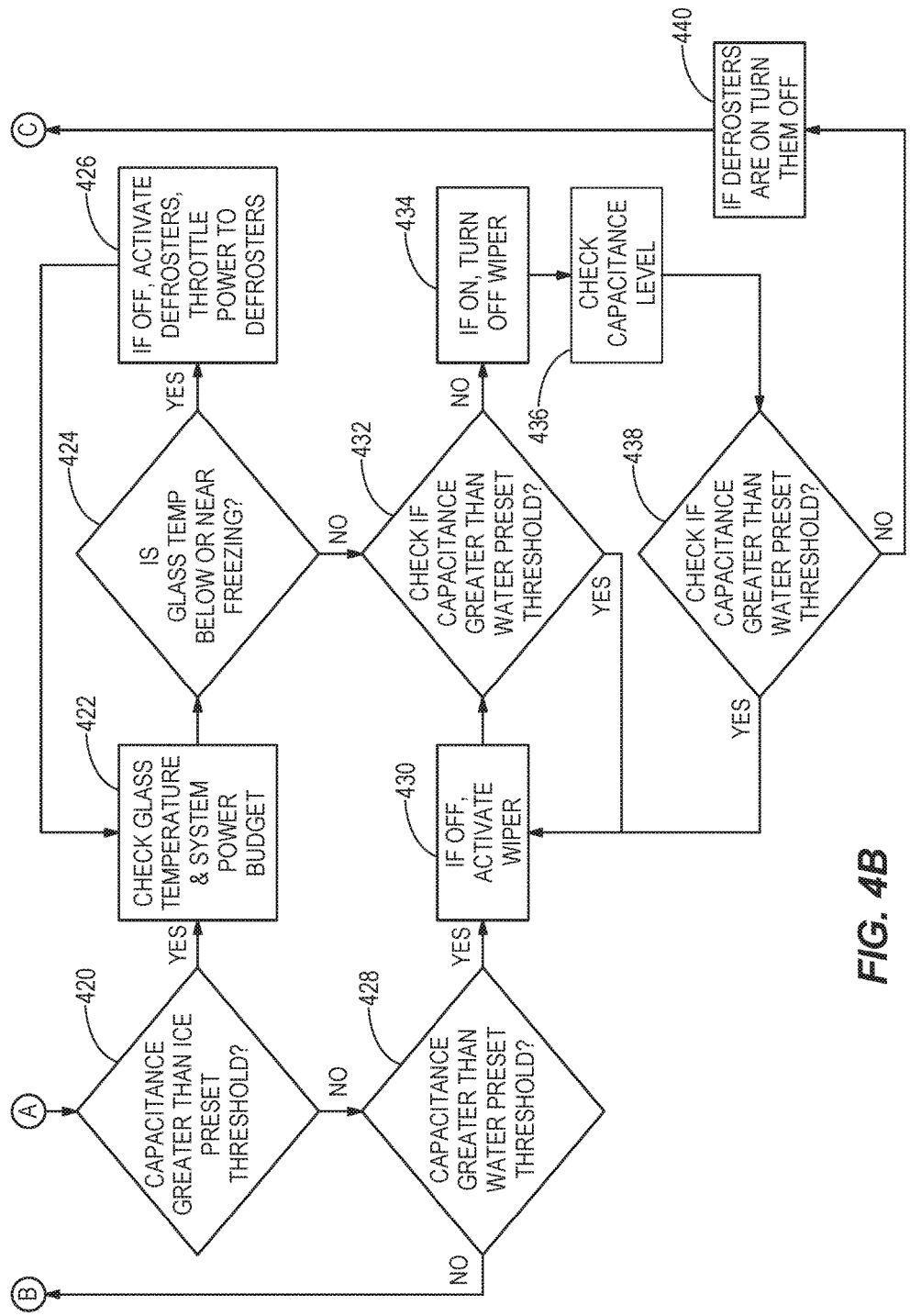

FIGS. 4A and 4B are flow diagrams of a completely closed loop control system according to another embodiment of the invention that detects moisture, dirt and debris, and also includes power management for the lens defroster. In FIG. 4A, the capacitance level of substrate 106 is sensed at block 402. If the digital capacitance value corresponding to the sensed capacitance is greater than a threshold indicative of a foreign object being present on substrate 106 as determined at block 404, the washer 124 is activated at block 406, the wiper 112 is then activated at block 408, and the wiper is turned OFF at block 410. The capacitance of substrate 106 is again sensed at block 412, and program control flow returns to block 404.

If the determination at block 404 is No, a determination is made at block 414 whether the sensed capacitance is greater than the digital capacitance value indicative of the presence of dirt or mud on substrate 106. If the answer at block 414 is Yes, washer 124 is activated at block 416, wiper 112 is activated at block 418, and program control flow proceeds to block 410 to deactivate wiper 112.

If the determination at block 414 is No, program control flow proceeds to block 420 to determine whether the digital capacitance value is indicative of the presence of ice or snow on substrate 106. If the answer at block 420 is Yes, the temperature of the substrate is sensed at block 422 and the available power for powering wiper defroster 116 and window defroster 120 is determined at block 422.

In some embodiments of the invention, the control system includes a power management feature. A power budget or maximum power value is determined based upon the power requirements of all the devices requiring power. The power available for the system is determined, and power to the wiper and window defrosters is modulated or controlled so that the power budget is not exceeded. This power modulation involves turning ON power to the defrosters for a period of time and then turning OFF the power to the defrosters for a time period. Controller 102 controls the power management by switching ON and OFF electronic switches 114 and 118 as needed.

Referring to FIG. 4B, after block 422 a determination is made at block 424 whether the sensed substrate temperature is below a temperature threshold indicative that the substrate is at or near freezing. If the determination at block 424 is Yes, then wiper defroster 112 and substrate defroster 120 are turned ON at block 426, and power to these defrosters is controlled as described above to manage the power to the defrosters. Program control flow then returns to block 422. If the answer at block 424 is No, program control flow proceeds to block 432 discussed below.

In FIG. 4B, if the determination at block 420 is No, a determination is made at block 428 whether the digital capacitance value is greater than the threshold indicative of the presence of water on substrate 106. If the answer at block 428 is Yes, wiper 112 is turned ON (if it was OFF) at block 430, and the capacitance of substrate 106 is again sensed and a determination is made at block 432 whether water is still present on substrate 106. If the answer at block 432 is No, wiper 112 is turned OFF at block 434 (if the wiper was ON), the capacitance of substrate 106 is again sensed at block 436, and a determination is made at block 438 whether water is present on substrate 106. If the answer is No, the wiper and substrate defrosters are turned OFF at block 440 (if they were ON), and program control flow returns to block 402. If the determination at either block 432 or 438 is Yes, wiper 112 is turned ON (if it was OFF) and program control flow proceeds to block 430 so the water may be cleaned from the lens substrate.

Figure 5:
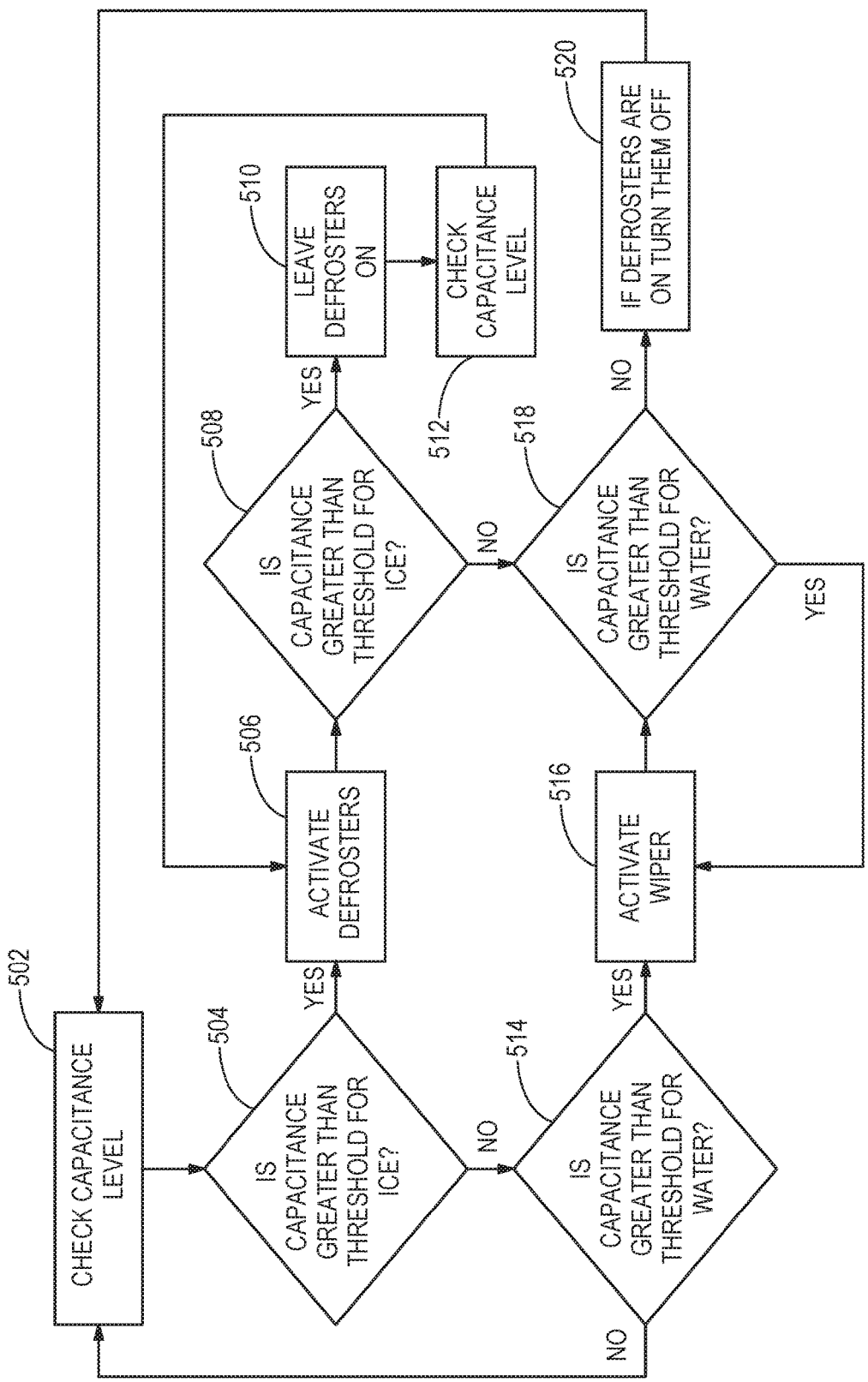
FIG. 5 is a flow diagram of a partial closed loop control system that detects moisture or another liquid according to another embodiment of the invention.

FIG. 5 is a flow diagram of a partial closed loop control system that detects moisture according to another embodiment of the invention. The embodiment in FIG. 5 does not include a temperature sensor, detection of dirt, mud or foreign objects, and does not include the power management feature of the embodiment in FIGS. 4A and 4B.

In FIG. 5, the capacitance of substrate 106 is sensed at block 502. A determination is then made at block 504 whether the digital capacitance value is greater than the threshold indicative of the presence of ice on substrate 106. If the answer is Yes, wiper defroster 116 and window defroster 120 are turned ON at block 506, and a determination is again made at block 508 whether ice is still present on substrate 106. If the answer is Yes, power to the defrosters is maintained at block 510 and the capacitance of substrate 106 is sensed at block 512. Program control flow then returns to block 508.

If the answer at block 504 is No, a determination is made at block 514 whether the sensed capacitance is greater than the capacitance threshold indicative of the presence of water on substrate 106. If the answer is No, program control flow returns to block 502. If the answer at block 514 is Yes, wiper 112 is turned ON at block 516 to remove the water from the substrate, the capacitance is again sensed, and a determination is made at block 518 whether the digital capacitance value is greater than the threshold for water. If the answer is Yes, program control flow returns to block 516 to turn on wiper 112. If the answer at block 518 is No, the wiper and substrate defrosters are turned OFF at block 520 and program control flow returns to block 502.

Figure 6A:
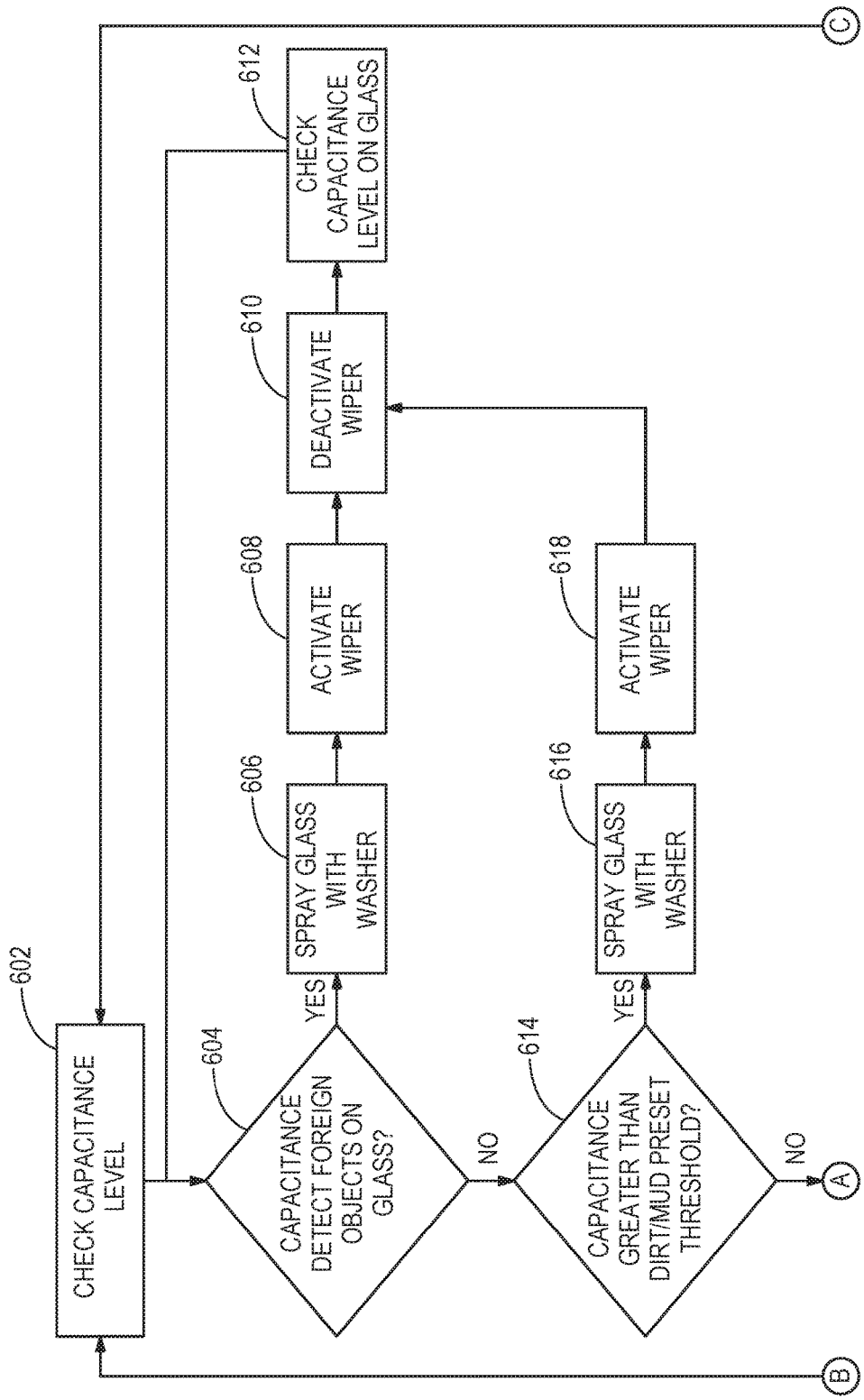
FIGS. 6A and 6B are flow diagrams of a partial closed loop control system according to another embodiment of the invention that detects moisture, dirt and debris, and includes power management for the lens defroster.
Figure 6B:
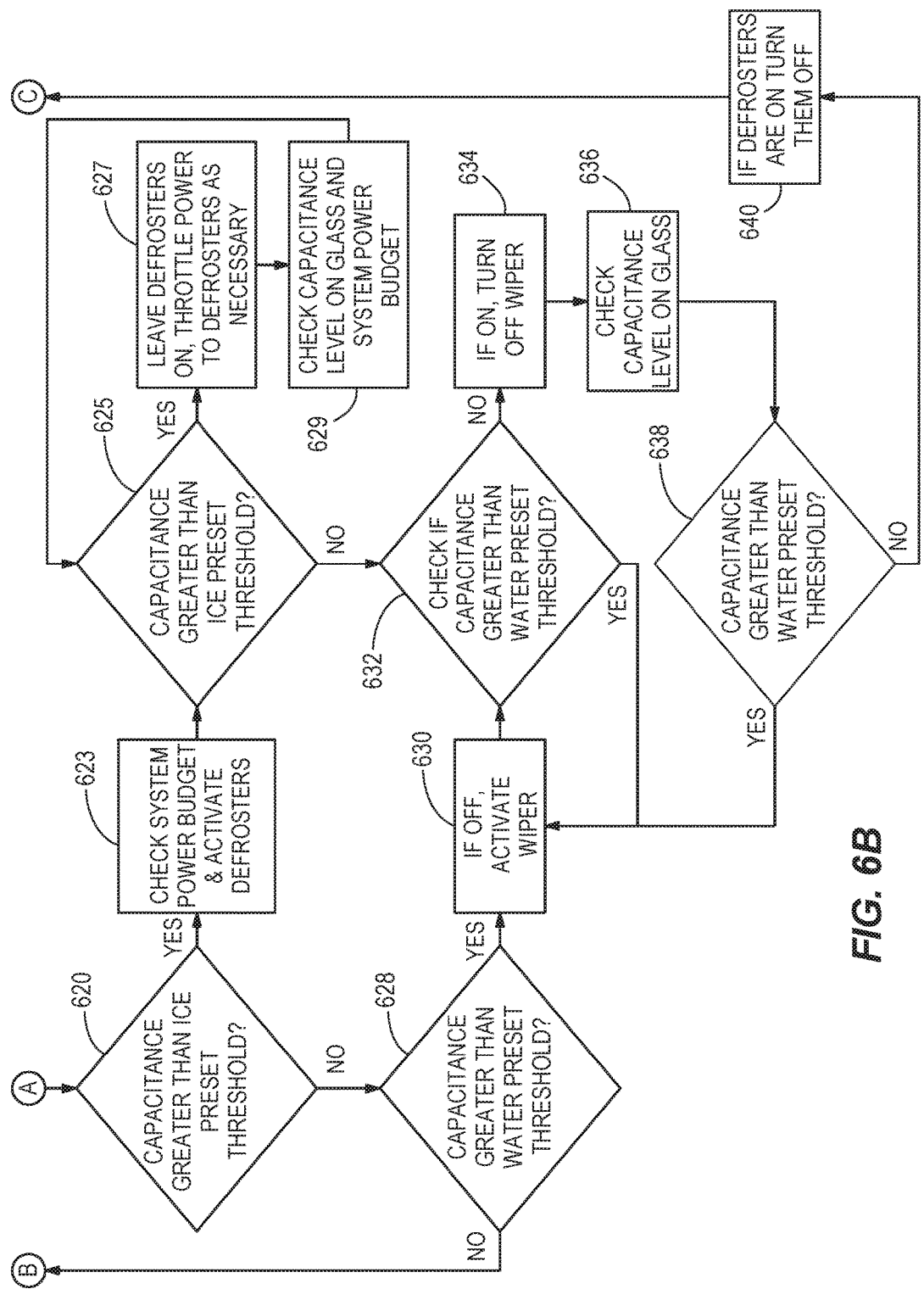

FIGS. 6A and 6B are flow diagrams of a partial closed loop control system according to another embodiment of the invention that detects moisture, dirt and debris, and includes power management for the lens defroster. The embodiment shown in FIGS. 6A and 6B is similar to the embodiment of FIGS. 4A and 4B except that it does not include a temperature sensor like the embodiment of FIGS. 4A and 4B.

In FIG. 6A, the capacitance level of substrate 106 is sensed at block 602. If the digital capacitance value corresponding to the sensed capacitance is greater than a threshold indicative of a foreign object being present on substrate 106 as determined at block 604, the washer 124 is activated at block 606, the wiper 112 is then activated at block 608, and the wiper is turned OFF at block 610. The capacitance of substrate 106 is again sensed at block 612, and program control flow returns to block 604.

If the determination at block 604 is No, a determination is made at block 614 whether the sensed capacitance is greater than the digital capacitance value or threshold indicative of the presence of dirt or mud on substrate 106. If the answer at block 614 is Yes, washer 124 is activated at block 616, wiper 112 is activated at block 618, and program control flow proceeds to block 610 to deactivate wiper 112.

If the determination at block 614 is No, control flow proceeds to block 620 to determine whether the digital capacitance value is indicative of the presence of ice or snow on substrate 106. If the answer at block 620 is Yes, status of the system power bud get is determined at block 623 power to wiper defroster 116 and window defroster 120 is provided in accordance with the power budget. The management of power to the defrosters in the embodiment of FIGS. 6A and 6B is similar to the power management discussed above in connection with FIGS. 4A and 4B.

In FIG. 6B, after block 623 a determination is made at block 625 whether the digital capacitance value is greater than the threshold for ice. If the answer is Yes, power to the wiper and substrate defrosters is maintained at block 627 if there is sufficient power available in accordance with the remaining power budget. If the answer at block 625 is No, program control flow proceeds to block 632 discussed below. At block 629, the capacitance of substrate 106 is again sensed and the status of the system power budget is determined. Program control flow returns to block 625.

In FIG. 6B, if the determination at block 620 is No, a determination is made at block 628 whether the digital capacitance value is greater than the threshold indicative of the presence of water on substrate 106. If the answer at block 628 is Yes, wiper 112 is turned ON (if it was OFF) at block 630, and the capacitance of substrate 106 is again sensed and a determination is made at block 632 whether water is still present on substrate 106. If the answer at block 632 is No, wiper 112 is turned OFF at block 634 (if the wiper was ON), the capacitance of substrate 106 is again sensed at block 636, and a determination is made at block 638 whether water is present on substrate 106. If the answer is No, the wiper and substrate defrosters are turned OFF at block 640 (if they were ON), and program control flow returns to block 602. If the determination at either block 632 or 638 is Yes, wiper 112 is turned ON (if it was OFF) and program control flow proceeds to block 630 so the water may be cleaned from the lens substrate.

Figure 7A:
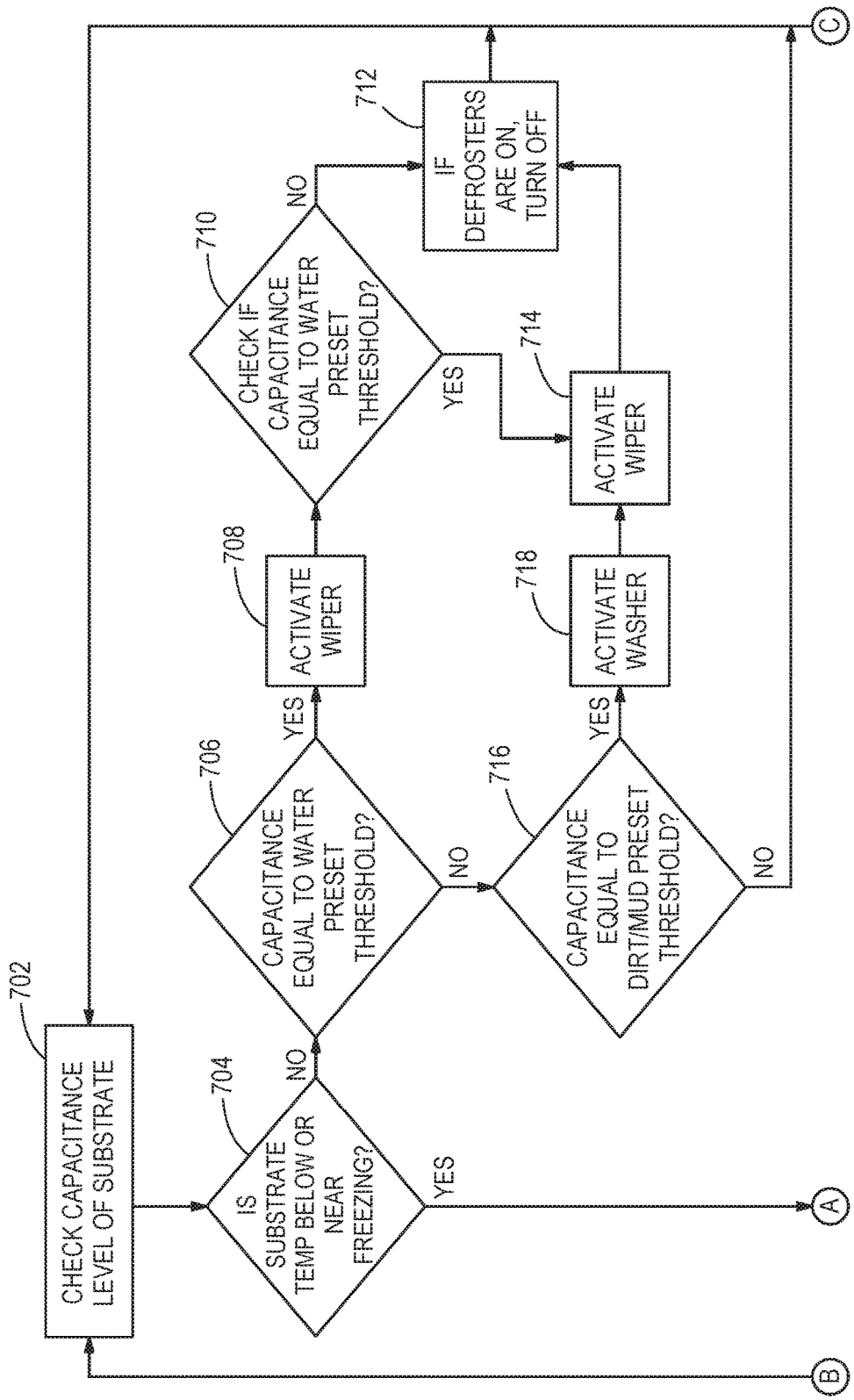
FIGS. 7A and 7B are flow diagrams of completely closed loop control system according to another embodiment of the invention that detects ice, liquid, dirt and debris, and also includes power management for the lens defroster.
Figure 7B:
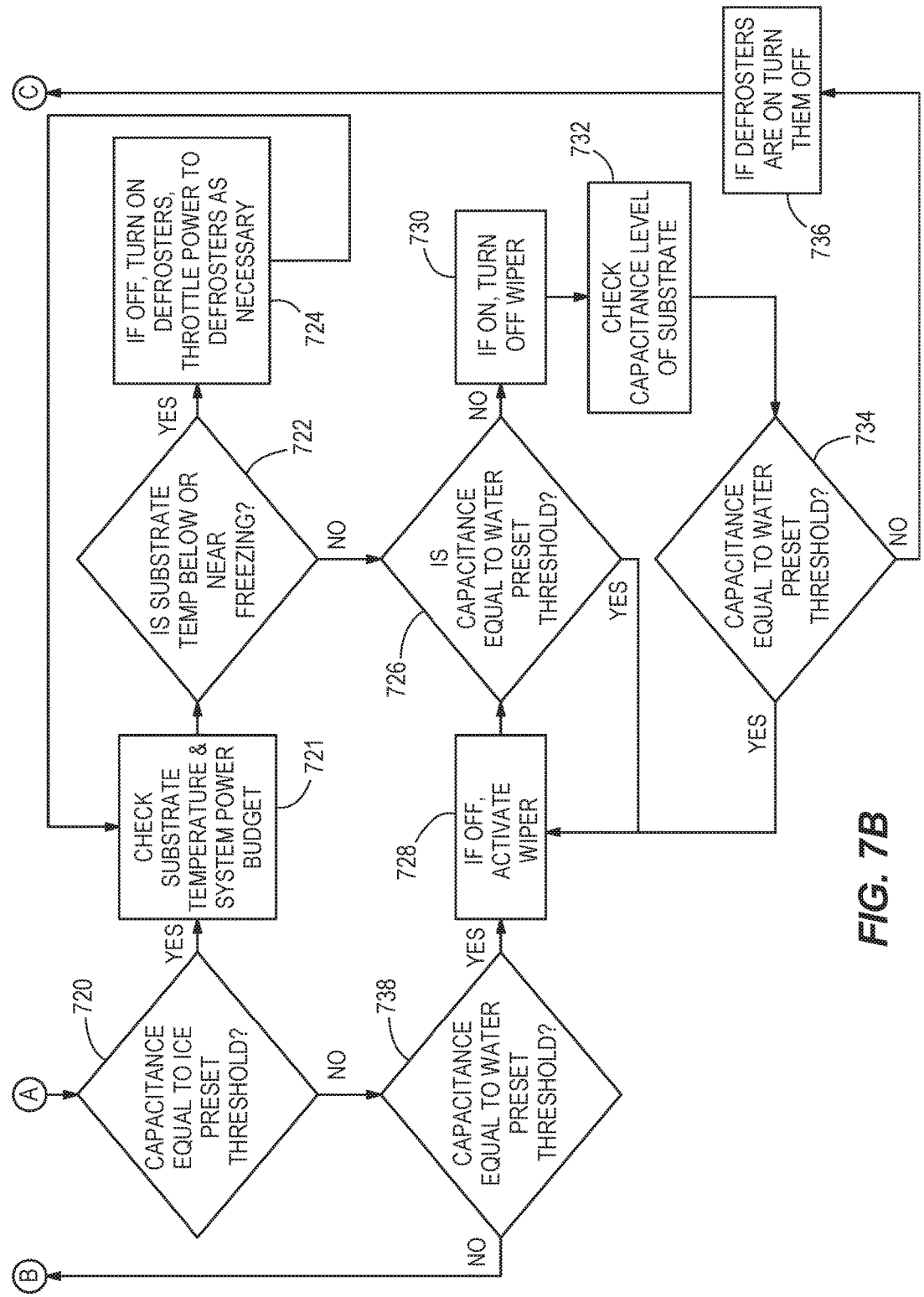

FIGS. 7A and 7B are flow diagrams of another embodiment of a completely closed loop control system according to the invention. In FIG. 7A, the capacitance level of substrate 106 is sensed at block 702. The temperature of an inner surface of substrate 106 is sensed. The temperature of the inner surface is correlated to the temperature of the outer surface of substrate 106. A determination is made at block 704 whether the sensed temperature is at or near the freezing point of water. If the answer is No, then a determination is made at block 706 whether the sensed capacitance is equal to the threshold capacitance of water. If the answer is No, the wiper is activated at block 708 and a determination is made at block whether the sensed capacitance is still equal to the threshold capacitance of liquid water. If the answer is NO, the defrosters are turned OFF at block 712 if they had been ON and the capacitance is again checked at block 702. If the answer is Yes at block 710, the wiper is again activated at block 714 and program control flow proceeds to block 712 as discussed above.

Referring again to FIG. 7A, program control flow proceeds to block 716 if the answer at block 706 is No. A determination is made at block 716 whether the sensed capacitance is equal to the threshold capacitance for dirt or mud. If the answer is No, program control flow proceeds to block 702. If the answer at block 716 is Yes, the washer is activated at block 718, the wiper is activated at block 714, and program control flow proceeds to block 702.

If the answer at block 704 is Yes, it is possible that ice is present on the outer surface of substrate 106. In FIG. 7B, a determination is then made at block 720 whether the sensed capacitance is equal to the threshold capacitance for ice. If the answer is Yes, the substrate temperature and status of the system power budget are checked at block 721. If the substrate temperature is below or near freezing, at block 722, the defrosters are turned ON at block 724 and power to the defrosters is controlled as required by the system power budget. Program control flow then proceeds to block 720.

In FIG. 7B If the answer at block 722 is No, a determination is made at block 726 whether the sensed capacitance is equal to the threshold capacitance for water. If the answer is Yes, program control flow proceeds to block 728 to turn ON the wiper. If the answer at block 726 is No, the wiper is turned OFF at block 730, and the capacitance of the substrate is checked at block 732. If the sensed capacitance is equal to the threshold capacitance for water at block 734, program control flow proceeds to block 728. If the sensed capacitance at block 734 is less than the water threshold, the defrosters are turned OFF at block 736 and program control flow proceeds to block 702.

Again in FIG. 7B, if the answer at block 720 is No, a determination is made at block 738 whether the sensed capacitance is equal to the threshold capacitance for water. If the answer is Yes, program control flow proceeds to block 728 as discussed above. If the answer at block 738 is No, program control flow proceeds to block 702.

Figure 8:
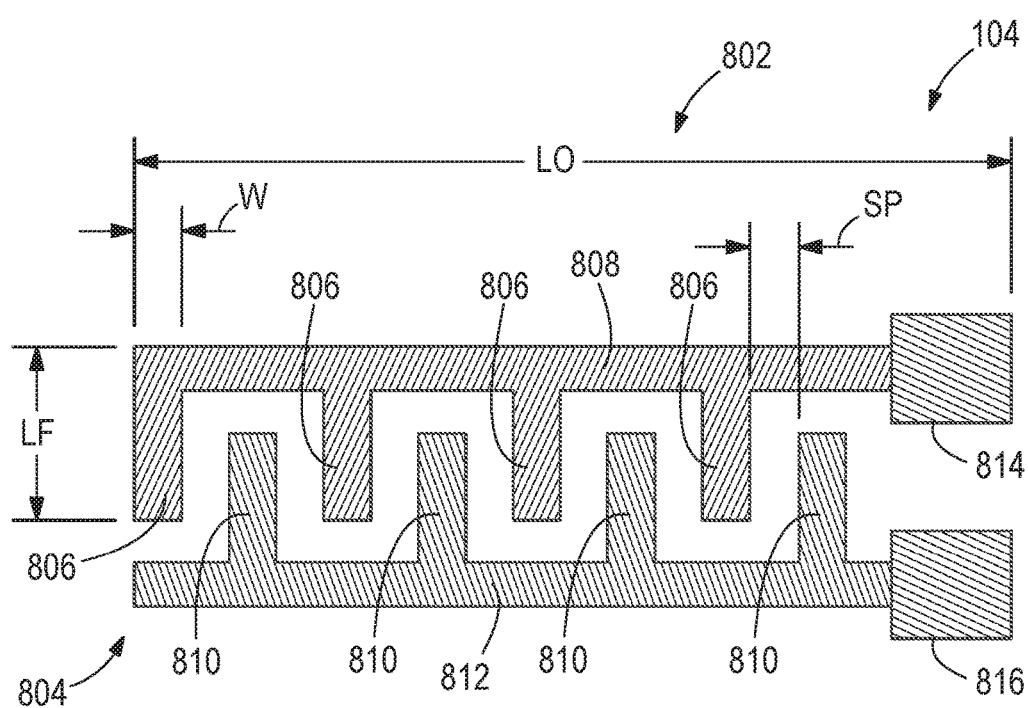
FIG. 8 depicts a capacitive sensor that may be used with the invention.
Figure 9A:
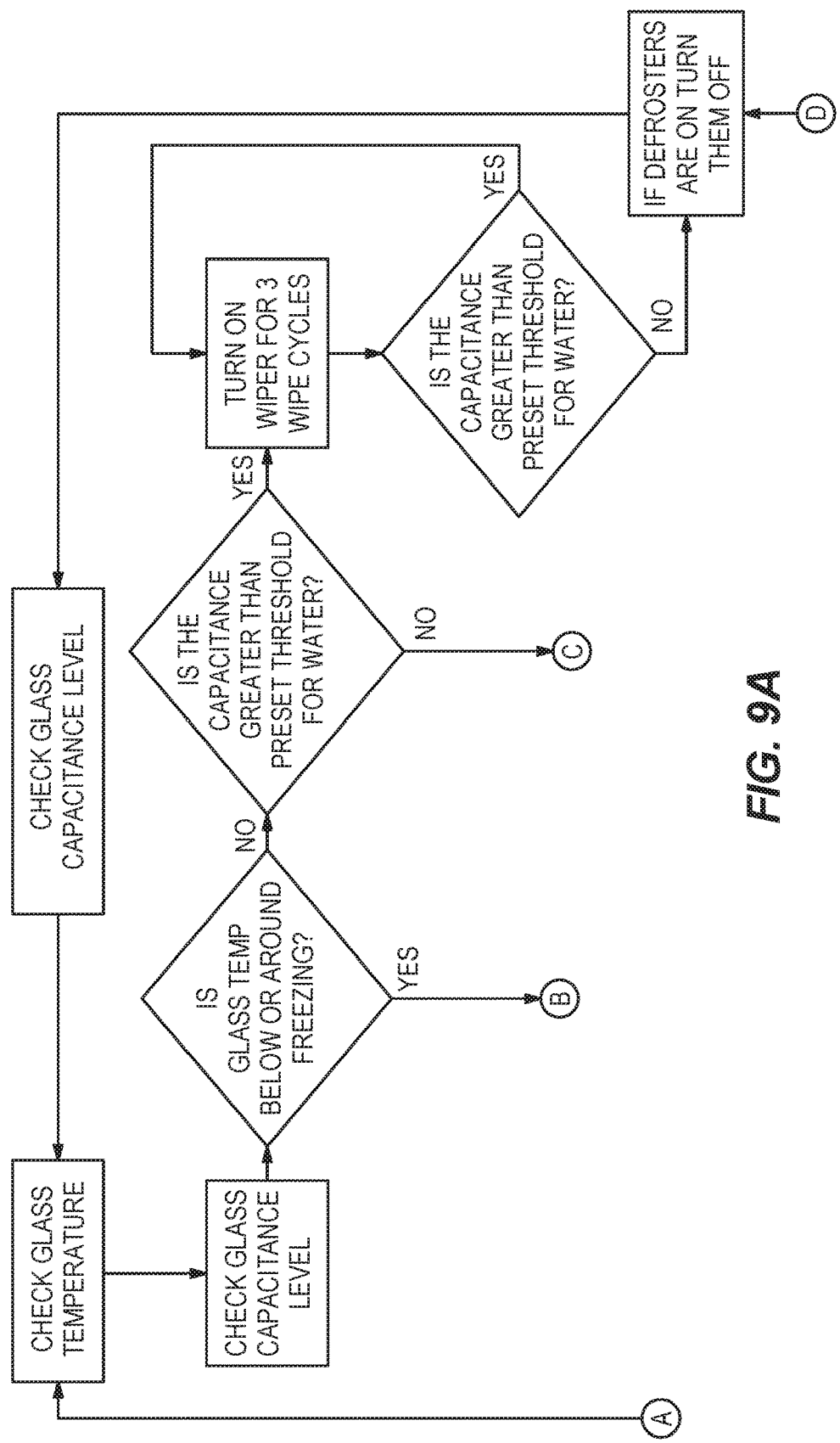
FIGS. 9A and 9B are flow diagrams of a completely closed loop control system according to another embodiment of the invention that is similar to the FIG. 3 embodiment.
Figure 9B:
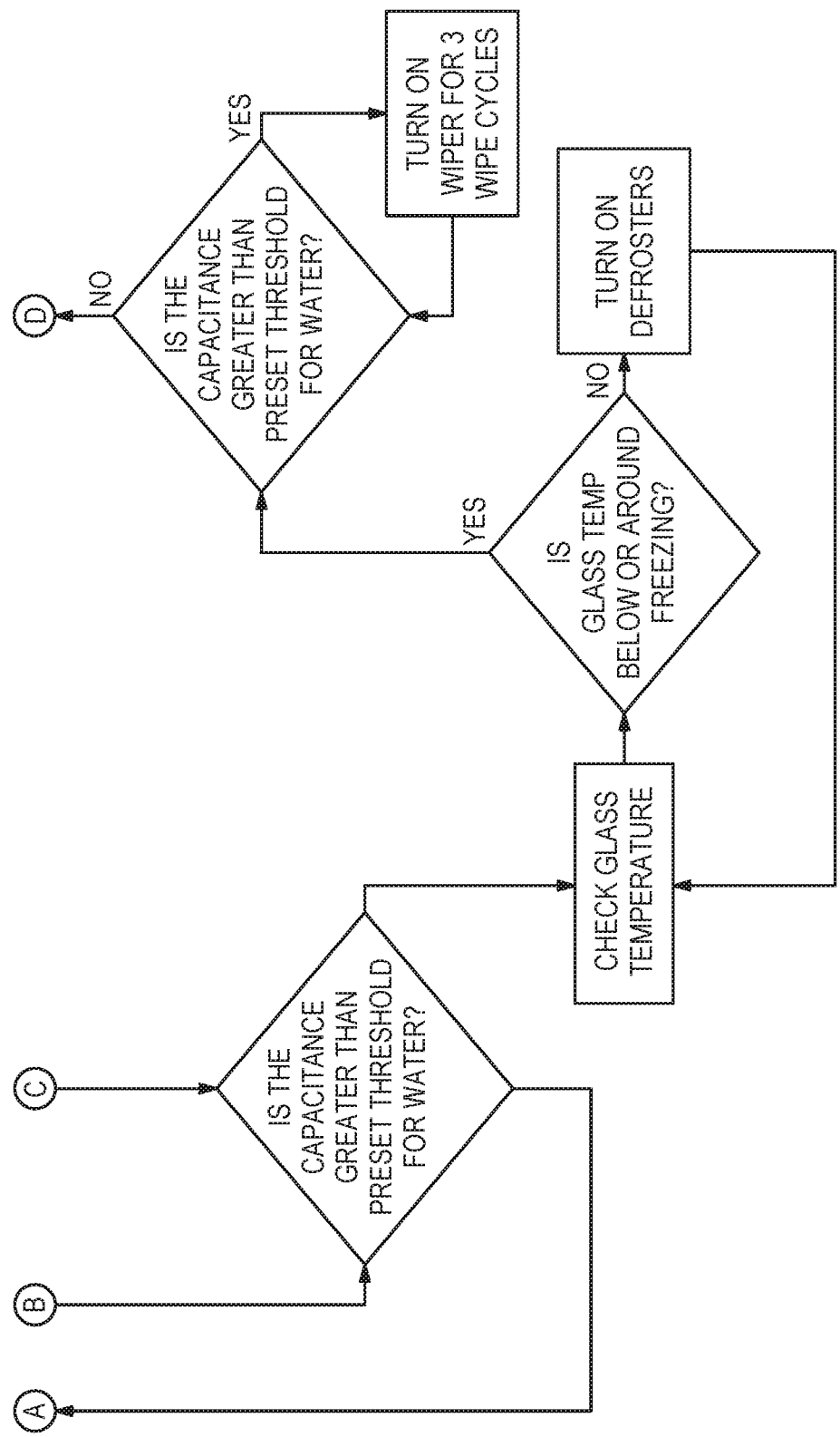
Figure 10A:
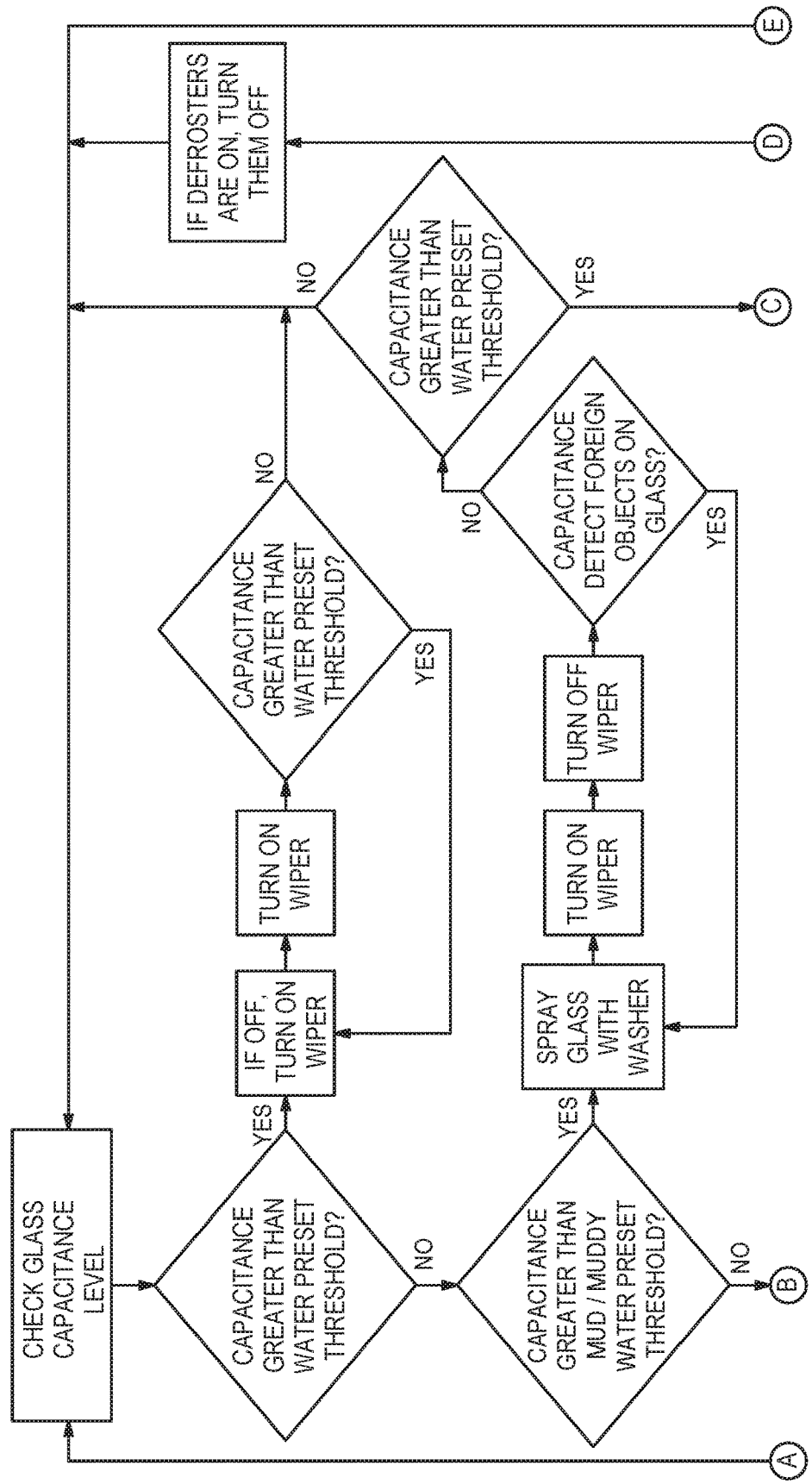
FIGS. 10A and 10B are flow diagrams of a completely closed loop control system according to another embodiment of the invention that is similar to the embodiment of FIGS. 4A and 4B.
Figure 10B:
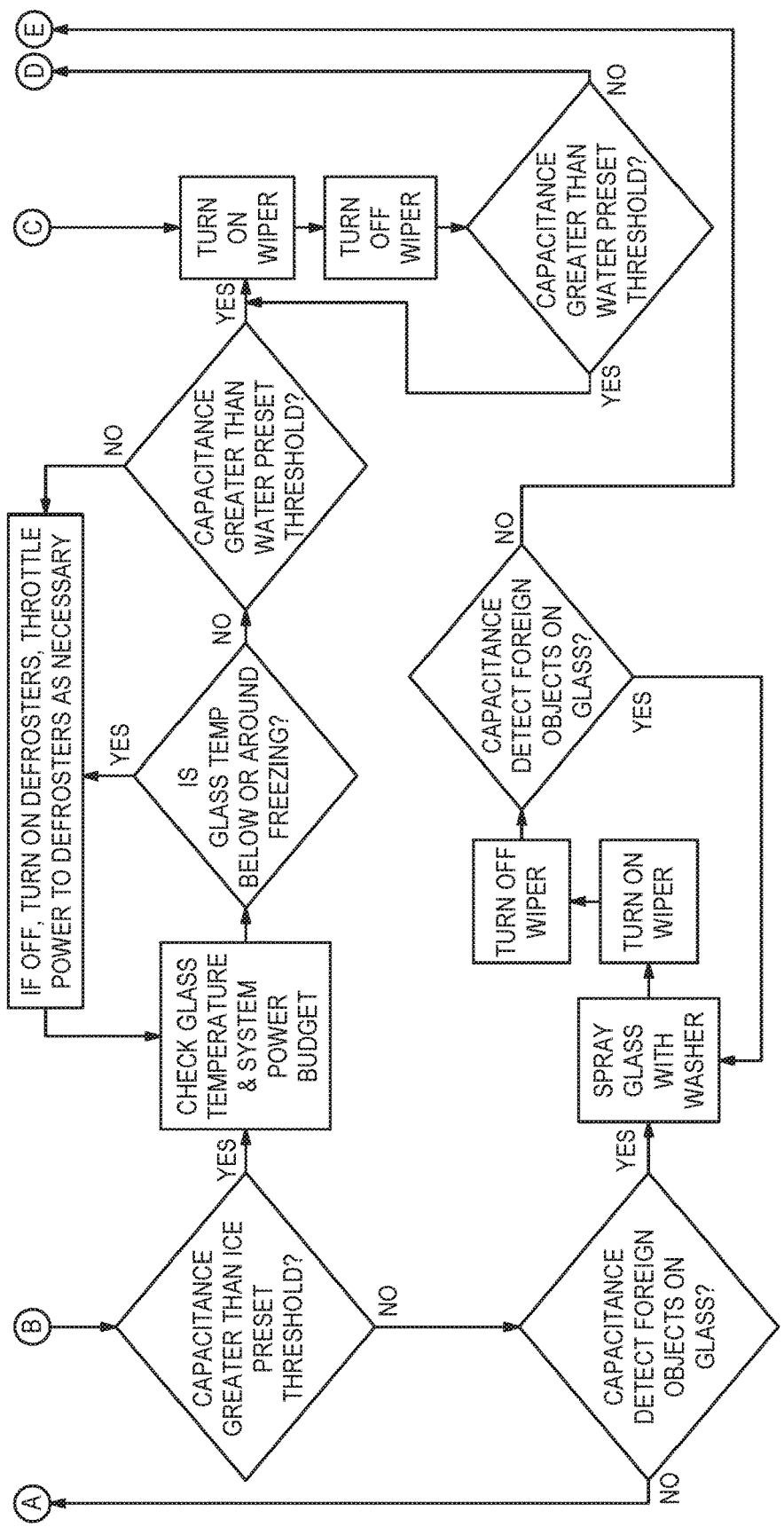
Figure 11A:
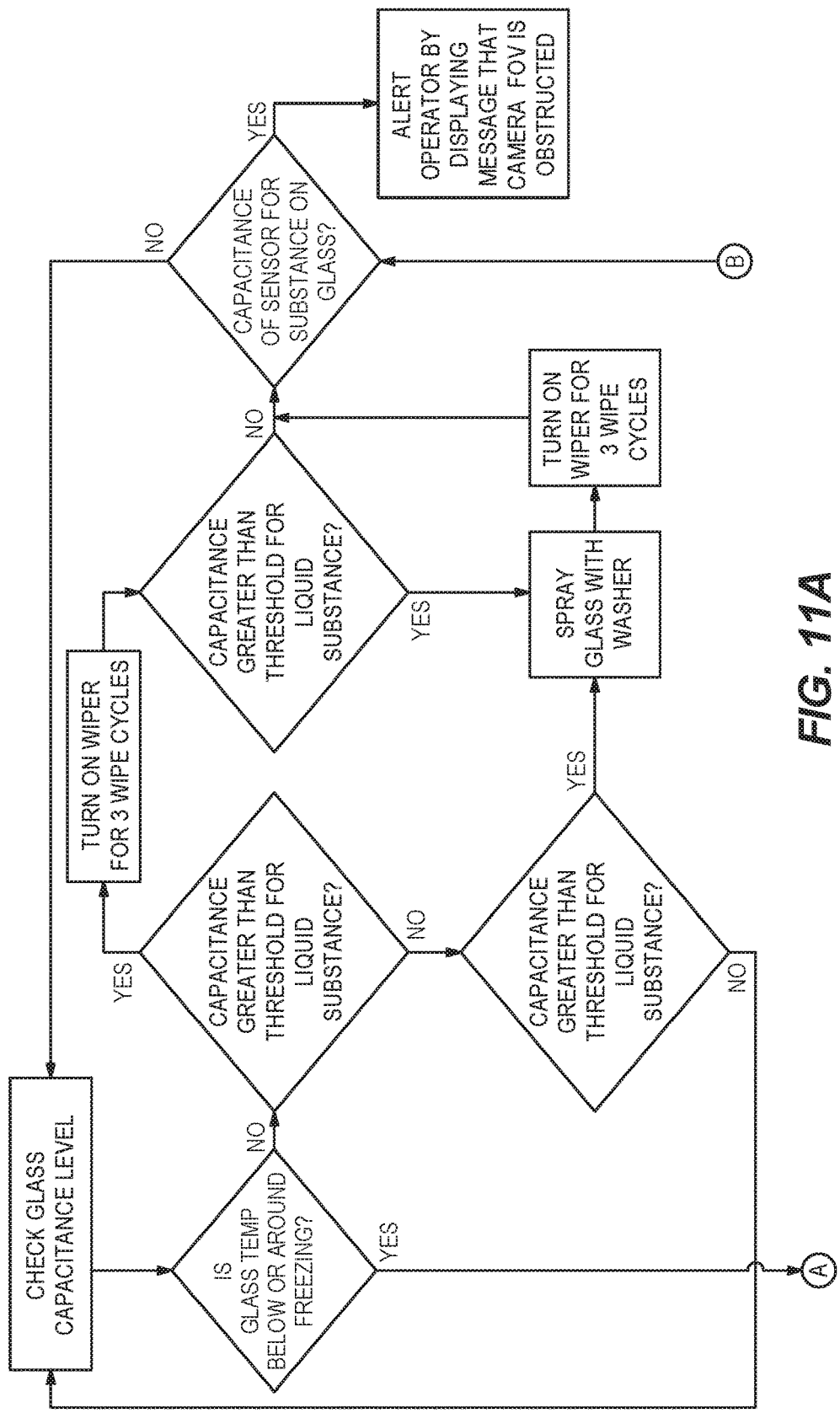
FIGS. 11A and 11B are flow diagrams of a completely closed loop control system according to another embodiment of the invention that is similar to the embodiment of FIGS. 7A and 7B.
Figure 11B:
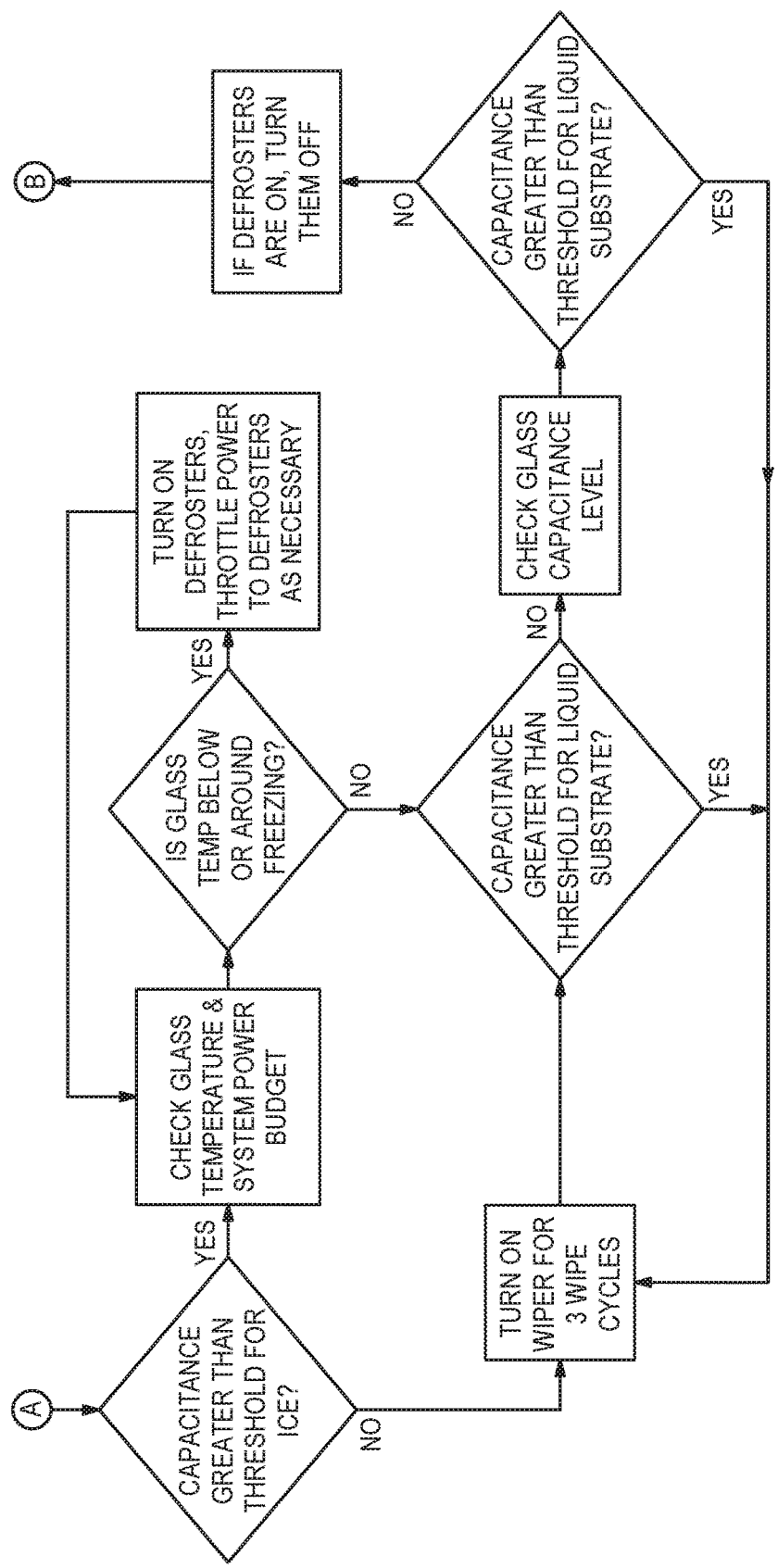
Figure 12:
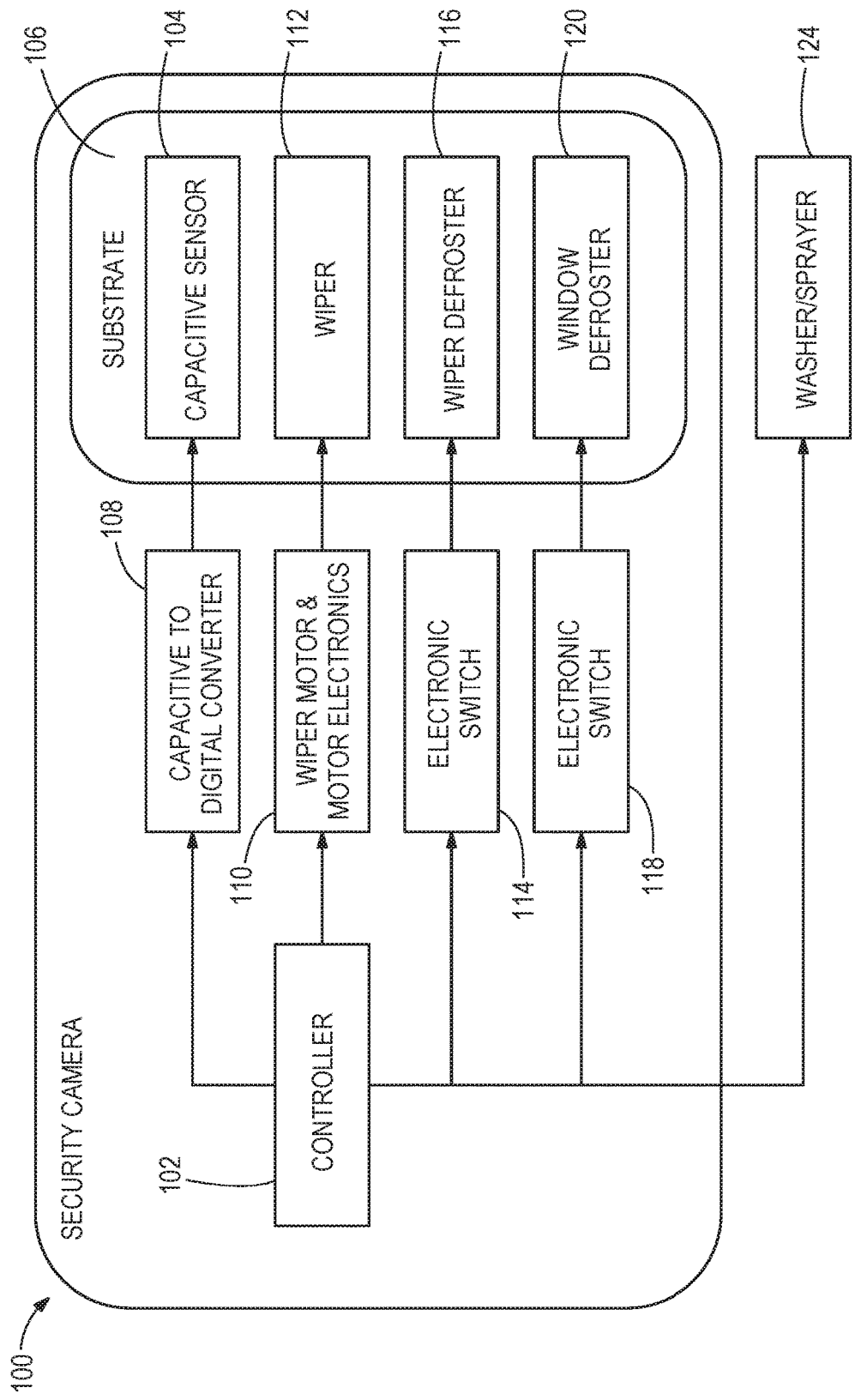
FIG. 12 is a block diagram depicting a partial closed loop surveillance camera control system that is similar to FIG. 1 but without the temperature sensor feedback.
Figure 13:
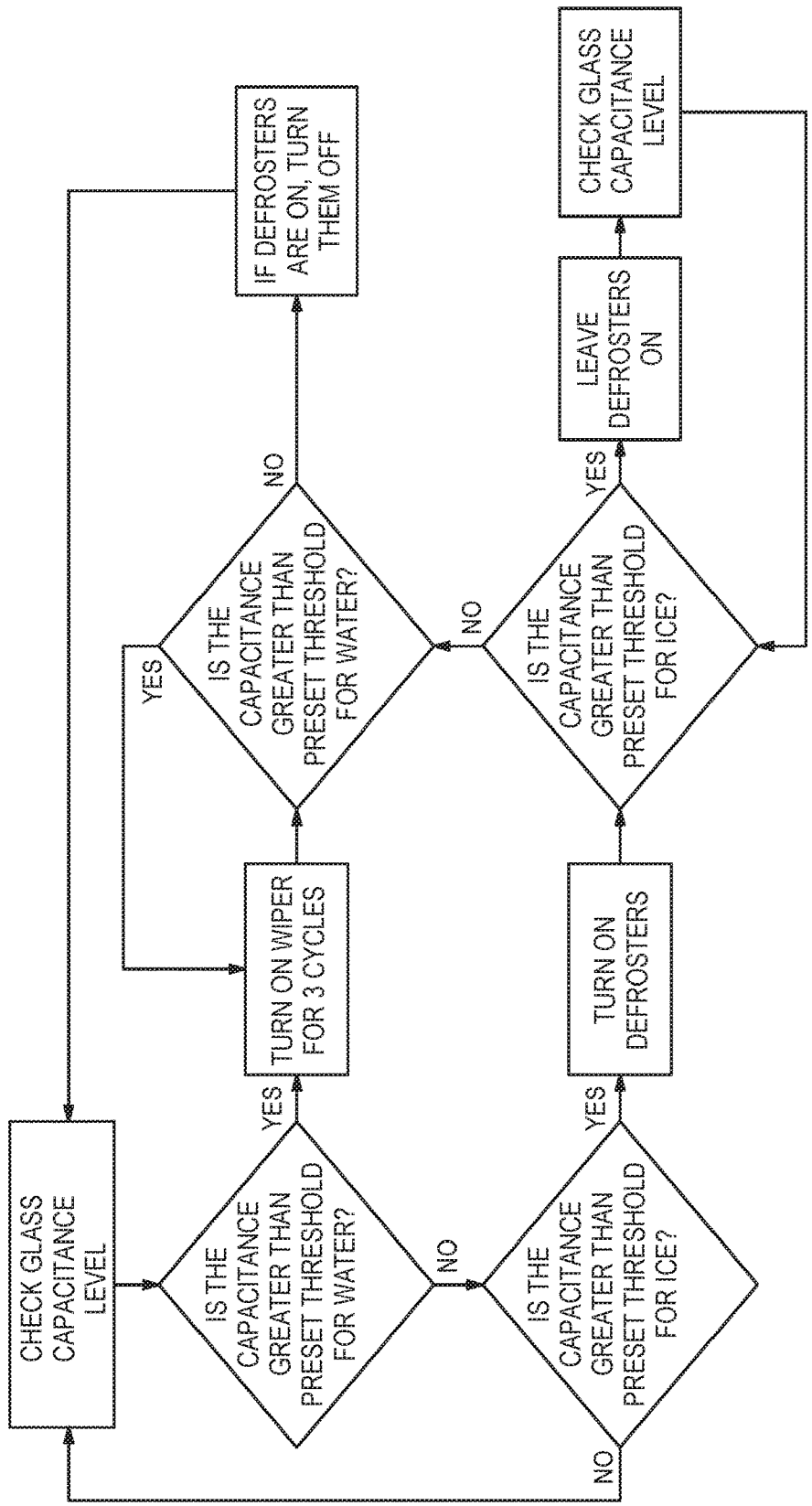
FIG. 13 is a flow diagram of a partial closed loop control system according to another embodiment of the invention that is similar to the embodiment depicted in FIG. 5.
Figure 14A:
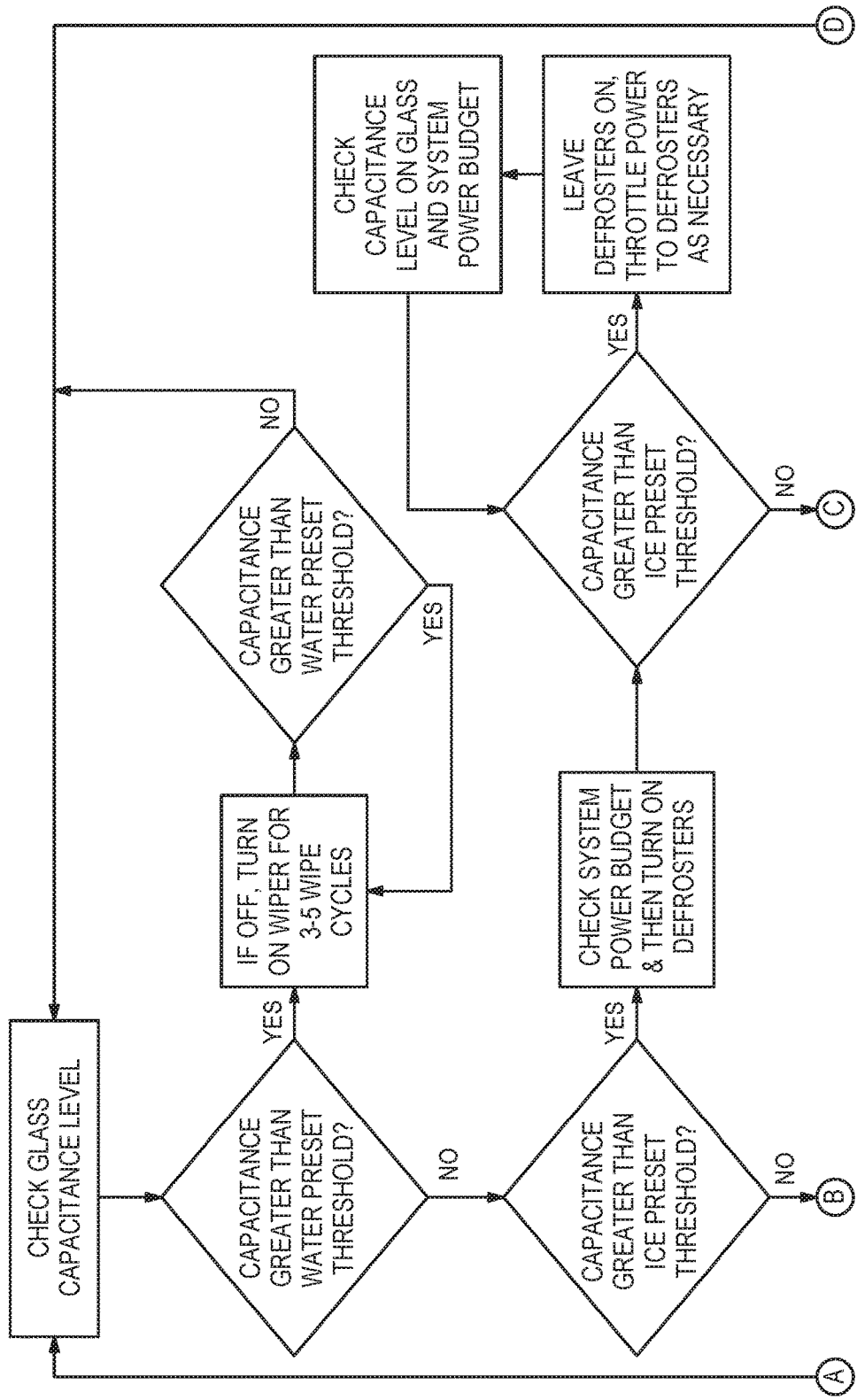
FIGS. 14A and 14B are flow diagrams of a partial closed loop control system according to another embodiment of the invention that is similar to the embodiment depicted in FIGS. 6A and 6B.
Figure 14B:
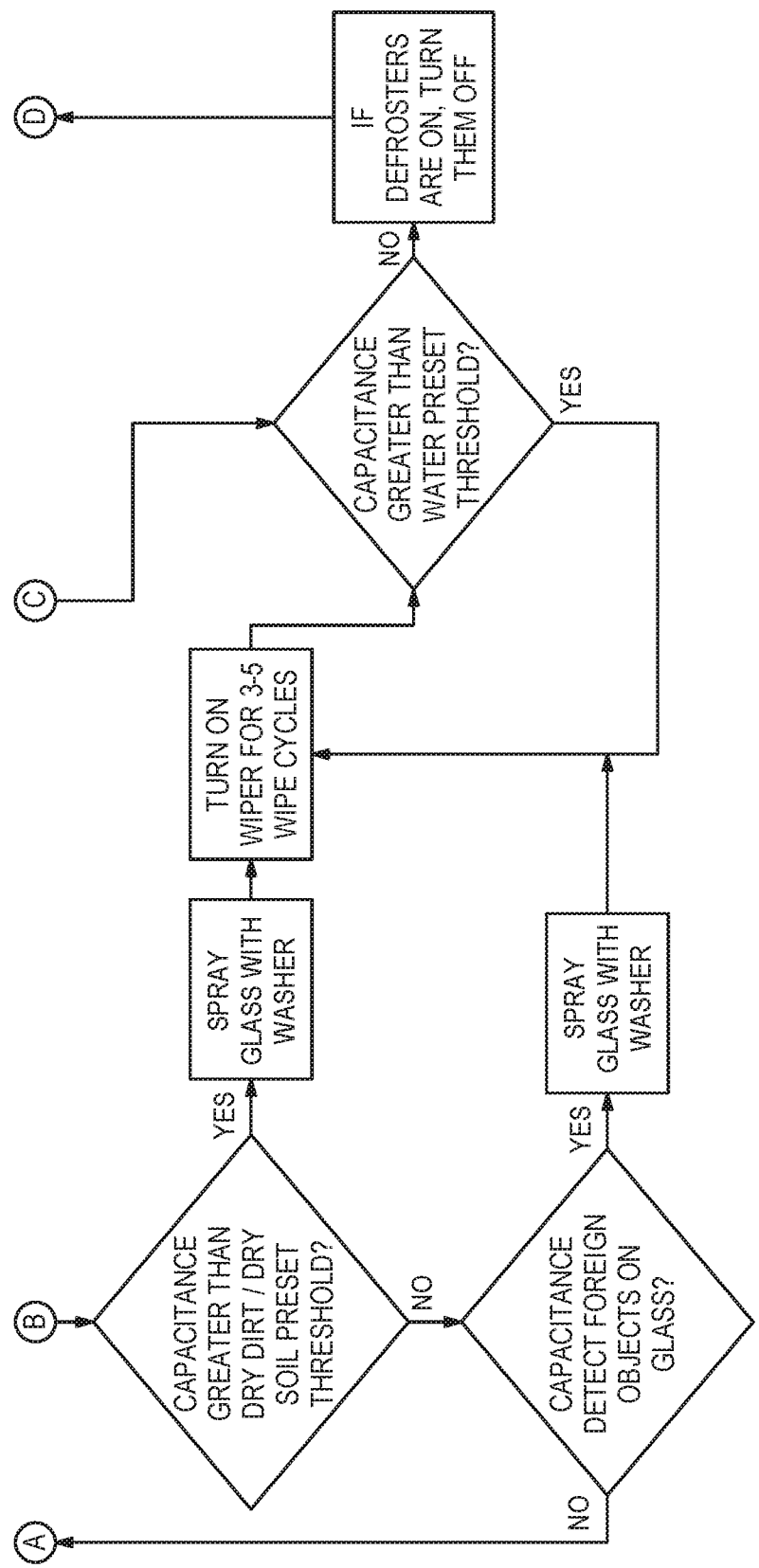

FIG. 8 depict a capacitive sensor 104 according to the present invention. In FIG. 8, capacitive sensor 104 is an inter-digital sensor having a first electrode 802 and a second electrode 804 spaced from first electrode 804. First electrode 802 has a first plurality of spaced fingers 806 extending from a first base 808, and second electrode 804 has a second plurality of spaced fingers 810 extending from a second base 812. First and second electrical contacts 714 and 716 are formed by metal deposition at ends of respective first base 808 and second base 812. Wires are soldered to the electrical contacts. In the embodiment shown in FIG. 8 and assuming a substrate thickness no greater than 4.5 mm, the first and second electrodes have an overall length LO of 37 mm including their electrical contacts, and each finger has a length LF. With an overall length LO of 37 mm, finger lengths of 12 to 15 mm can be used. However, finger lengths from about 7 mm to 20 mm or greater may be used in other applications. In FIG. 8, the fingers 806 and 810 have a width W of 2 mm, and the spacing SP between adjacent fingers from the first plurality and the second plurality is 2 mm. The dimensions of the capacitive sensor 104 are dependent upon the thickness of the substrate 106 on which the capacitive sensor has been deposited or attached. The thicker the substrate, the larger the capacitive sensor should be.

FIG. 9A through FIG. 14B relate to alternate embodiments of the invention which are similar to the embodiments discussed above in connection with FIG. 1 through FIG. 7B except that, in large part, the order of the blocks and the instructions are changed. The descriptions above regarding the blocks and operations of the FIGS. 1 through 7B embodiments are applicable to the embodiments depicted in FIGS. 9A through 14B and are incorporated by reference herein. The sensor depicted and described in connection with FIG. 8 is used with all the embodiments of the invention described herein.

Various features and advantages of the invention are set forth in the following claims.

What is claimed is:
1. A method for cleaning a lens of a surveillance camera, comprising:
   sensing, with a capacitance sensor, a sensed capacitance of the lens of the surveillance camera, the sensed capacitance indicating the type of foreign object detected on the lens;
   converting, with a capacitive to digital converter, the sensed capacitance to a digital capacitance value;
   activating, with a controller, a first device when the digital capacitance value exceeds a first threshold value that is greater than a second threshold value, wherein the first device is at least one of a lens wiper, a lens defroster and a lens sprayer;
   cleaning the lens with the first device;
   activating, with the controller, a second device when the digital capacitance value is less than the first threshold value and greater than the second threshold value, wherein the second device is at least one of the lens wiper, the lens defroster and the lens sprayer; and
   cleaning the lens with the second device, wherein the second device is not the same as the first device.

2. The method of claim 1, further comprising:
activating, with the controller, a third device when the digital capacitance value is less than the second threshold value and exceeds a third threshold value that is less than the second threshold value, wherein the third device is at least one of the lens wiper, the lens defroster and the lens sprayer; and
cleaning the lens with the third device.

3. The method of claim 1, wherein activating the first device includes activating the lens defroster, and wherein activating the second device includes activating the lens wiper, the method further comprising:
defrosting the lens with the lens defroster after the lens defroster is activated; and
wiping the lens with the lens wiper after the lens wiper is activated.

4. The method of claim 1, further comprising:
sensing, with a temperature sensor, a temperature of the lens,
wherein activating the first device includes activating the first device when the sensed temperature exceeds a temperature threshold; and
cleaning the lens with the first device.

5. The method of claim 2, wherein activating the first device includes activating the lens defroster, wherein activating the second device includes activating the lens sprayer, and wherein activating the third device includes activating the lens wiper, and wherein the method further comprises:
defrosting the lens with the lens defroster after the lens defroster is activated;
spraying the lens with the lens sprayer after the lens sprayer is activated; and
wiping the lens with the lens wiper after the lens wiper is activated.

6. The method of claim 4, further comprising:
controlling power to the lens defroster to maintain the power of the lens defroster below a power threshold, including turning on the power to the lens defroster for a first time period and then turning off the power to the lens defroster for a second time period.

7. The method of claim 5, further comprising:
sensing, with a temperature sensor, a temperature of the lens,
wherein activating the first device includes activating the lens defroster when the sensed temperature exceeds a temperature threshold; and
defrosting the lens with the lens defroster.

8. The method of claim 7, further comprising:
controlling power to the lens defroster to maintain the power of the lens defroster below a power threshold, including turning on the power to the lens defroster for a first time period and then turning off the power to the lens defroster for a second time period.

9. A method for cleaning a lens of a surveillance camera, comprising:
sensing, with a capacitance sensor, a sensed capacitance of the lens of a surveillance camera, the sensed capacitance indicating the type of foreign object detected on the lens;
converting, with a capacitive to digital converter, the sensed capacitance to a first digital capacitance value;
activating, with a controller, a first device when the first digital capacitance value exceeds a first threshold value that is greater than a second threshold value, wherein the first device is at least one of a lens wiper, a lens defroster and a lens sprayer;
cleaning the lens with the first device;
activating, with the controller, a second device when the first digital capacitance value is less than the first threshold value and greater than the second threshold value, wherein the second device is at least one of the lens wiper, the lens defroster and the lens sprayer;
cleaning the lens with the second device, wherein the second device is not the same as the first device;
sensing, with the capacitance sensor, a second sensed capacitance of the lens;
converting, with the capacitive to digital converter, the second sensed capacitance to a second digital capacitance value;
activating, with the controller, the first device when the second digital capacitance value exceeds the first threshold value;
cleaning the lens with the first device;
activating, with the controller, the second device when the second digital capacitance value is less than the first threshold value and greater than the second threshold value; and
cleaning the lens with the second device.

10. The method of claim 9, further comprising:
sensing, with a temperature sensor, a temperature of the lens; and
controlling power to at least one of the first device and the second device when the sensed temperature exceeds a temperature threshold, including turning on the power to the at least one of the first device and the second device for a first time period and then turning off the power to the at least one of the first device and the second device for a second time period.

11. The method of claim 9, further comprising:
controlling power to at least one of the first device and the second device to maintain power to the at least one of the first device and the second device below a power threshold, including turning on the power to the at least of the first device and the second device for a first time period and then turning off the power to the at least one of the first device and the second device for a second time period.

* * * * *